(12) United States Patent
Chang

(10) Patent No.: US 8,072,570 B2
(45) Date of Patent: Dec. 6, 2011

(54) LIQUID CRYSTAL DISPLAY PANEL

(75) Inventor: Hsi-Ming Chang, Taoyuan County (TW)

(73) Assignee: Chunghwa Picture Tubes, Ltd., Bade, Taoyuan (TW)

(*) Notice: Subject to any disclaimer, the term of this patent is extended or adjusted under 35 U.S.C. 154(b) by 485 days.

(21) Appl. No.: 12/346,850

(22) Filed: Dec. 31, 2008

(65) Prior Publication Data

US 2010/0039598 A1 Feb. 18, 2010

(30) Foreign Application Priority Data

Aug. 13, 2008 (TW) ................................ 97130779 A

(51) Int. Cl.
*G02F 1/1343* (2006.01)
(52) U.S. Cl. ........... 349/141; 349/114; 349/113; 349/33
(58) Field of Classification Search ........................ None
See application file for complete search history.

(56) References Cited

U.S. PATENT DOCUMENTS

| 5,600,464 A * | 2/1997 | Ohe et al. ........................ 349/123 |
| 6,403,980 B1 | 6/2002 | Park |
| 2005/0157231 A1* | 7/2005 | Yang et al. ..................... 349/114 |
| 2006/0001787 A1* | 1/2006 | Lee et al. ......................... 349/40 |
| 2006/0097262 A1 | 5/2006 | Kim et al. |

FOREIGN PATENT DOCUMENTS

WO WO 03036374 A1 5/2003

* cited by examiner

*Primary Examiner* — Lucy Chien
(74) *Attorney, Agent, or Firm* — Winston Hsu; Scott Margo

(57) ABSTRACT

A liquid crystal display panel includes a plurality of scan lines, a plurality of data lines, a pixel array, a plurality of first common electrode lines and at least one second common electrode line. The first common electrode lines receive a common electrode signal through at least one first input node positioned at a first side of the pixel array. The second common electrode line receives the common electrode signal through at least one second input node positioned at a second side of the pixel array. In addition, at least one first common electrode line is electrically connected to the second common electrode lines in the pixel array.

4 Claims, 6 Drawing Sheets

LIQUID CRYSTAL DISPLAY PANEL

BACKGROUND OF THE INVENTION

1. Field of the Invention

The present invention relates to a liquid crystal display panel, and more particularly, to a liquid crystal display panel where input nodes of a common electrode signal are positioned at different sides of a pixel array, and a common electrode signal is inputted into the pixel array through the input nodes positioned at different sides of the pixel array.

2. Description of the Prior Art

Please refer to FIG. 1. FIG. 1 is a diagram illustrating a prior art liquid crystal display (LCD) panel 100. As shown in FIG. 1, the LCD panel 100 includes a plurality of scan lines $G_1$-$G_m$, a plurality of data lines $S_1$-$S_n$, a pixel array 110 and a plurality of common electrode lines $Cs_1$-$Cs_m$. The pixel array 110 includes a plurality of pixels, where the pixels are interwoven by the scan lines $G_1$-$G_m$ and data lines $S_1$-$S_n$.

In the operations of the LCD panel 100, a common electrode signal Vcom is inputted into the common electrode lines $Cs_1$-$Cs_s$ through at least one input node (not shown) positioned at a left side of the pixel array 110. However, at a position far from the input node, such as a right side of the pixel array 110, the common electrode signal is easily influenced by voltages on the scan lines or the data lines and becomes unstable, further causing crosstalk and flicker phenomena.

SUMMARY OF THE INVENTION

It is therefore an objective of the present invention to provide a liquid crystal display panel where input nodes are positioned at different sides of a pixel array, and the common electrode signal is inputted into the pixel array through the input nodes positioned at different sides of the pixel array. The common electrode signal on the common electrode lines become more stable, and the problems associated with the prior art are solved.

According to one embodiment of the present invention, an LCD panel includes a plurality of scan lines, a plurality of data lines, a pixel array, a plurality of first common electrode lines and at least one second common electrode line. The first common electrode lines are coupled to at least one first input node positioned at a first side of the pixel array, and the common electrode signal is inputted into the pixel array through the first input node. In addition, the common electrode signal is inputted into the second common electrode line through at least one second input node positioned at a second side of the pixel array. The first common electrode lines are electrically connected to the second common electrode line in the pixel array.

According to the LCD panel of the present invention, the common electrode signal can be inputted into the pixel array through the input nodes respectively positioned at different sides of the pixel array. Therefore, the common electrode signals carried on the common electrode lines in the pixel array are more stable, degrees of crosstalk and flicker phenomena are decreased and display quality is improved.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
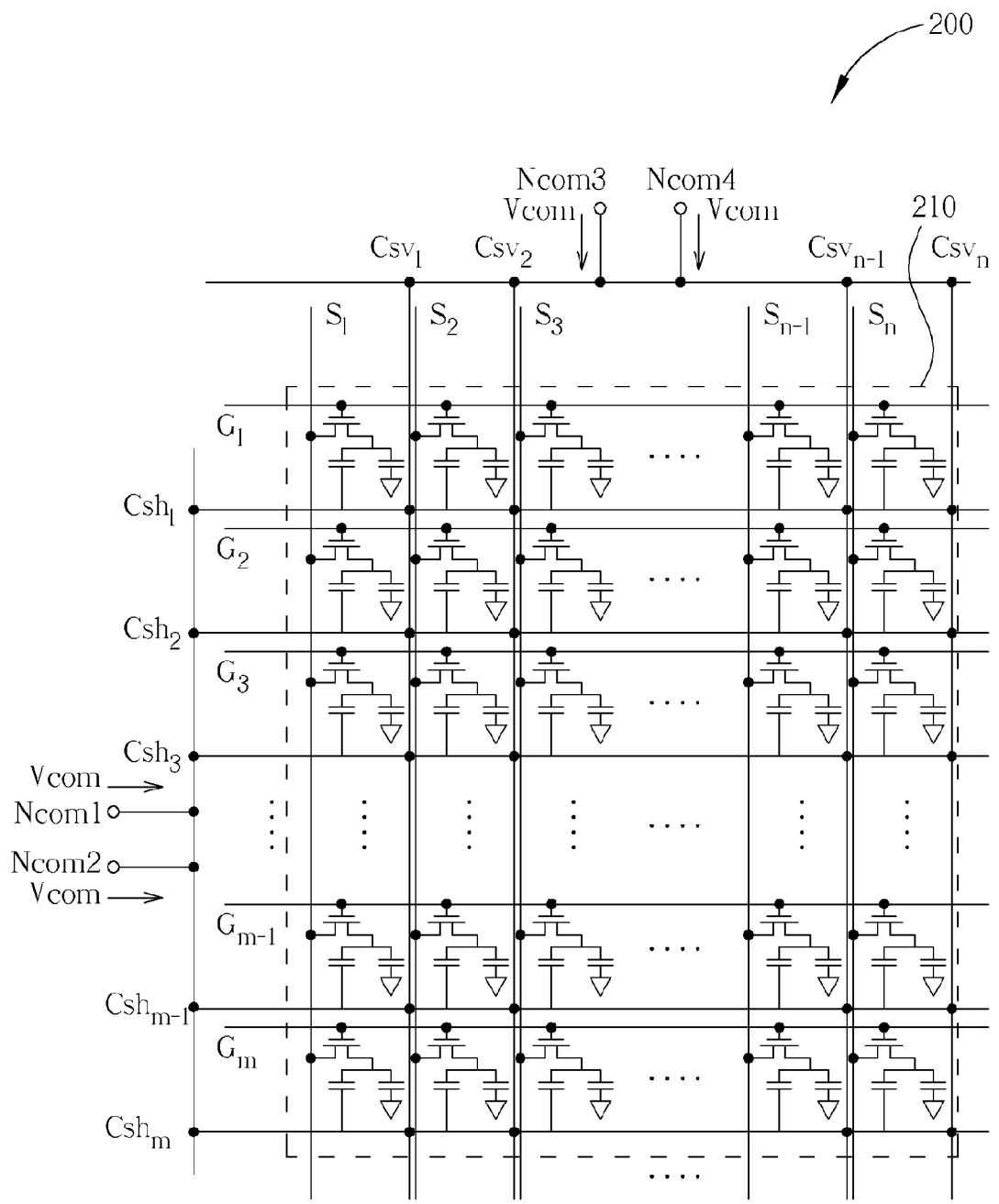
FIG. 2 is a diagram illustrating a liquid crystal display panel according to one embodiment of the present invention.

Please refer to FIG. 2. FIG. 2 is a diagram illustrating an LCD panel 200 according to one embodiment of the present invention. As shown in FIG. 2, the LCD panel 200 includes a plurality of scan lines $G_1$-$G_m$, a plurality of data lines $S_1$-$S_n$, a pixel array 210, a plurality of first common electrode lines $Csh_1$-$Csh_m$, a plurality of second common electrode lines $Csv_1$-$Csv_n$ and a plurality of input nodes (in this embodiment, four input nodes $Ncom_1$-$Ncom_4$ are shown). The pixel array 210 includes a plurality of pixels, where the pixels are interwoven by the scan lines $G_1$-$G_m$ and data lines $S_1$-$S_n$. In this embodiment, the first common electrode lines $Csh_1$-$Csh_m$ are coupled to the input nodes $Ncom_1$ and $Ncom_2$ both positioned at a left side of the pixel array 210, and the second common electrode lines $Csv_1$-$Csv_n$ are coupled to the input nodes $Ncom_3$ and $Ncom_4$ both positioned at a top side of the pixel array 210. In addition, the first common electrode lines $Csh_1$-$Csh_m$ are electrically connected to the second common electrode lines $Csv_1$-$Csv_n$ in the pixel array 210. It is noted that quantity of the input nodes shown in FIG. 2 is for illustrative purposes only, and not a limitation of the present invention; that is, quantity of the input nodes can be determined according to the designer's consideration.

Figure 1:
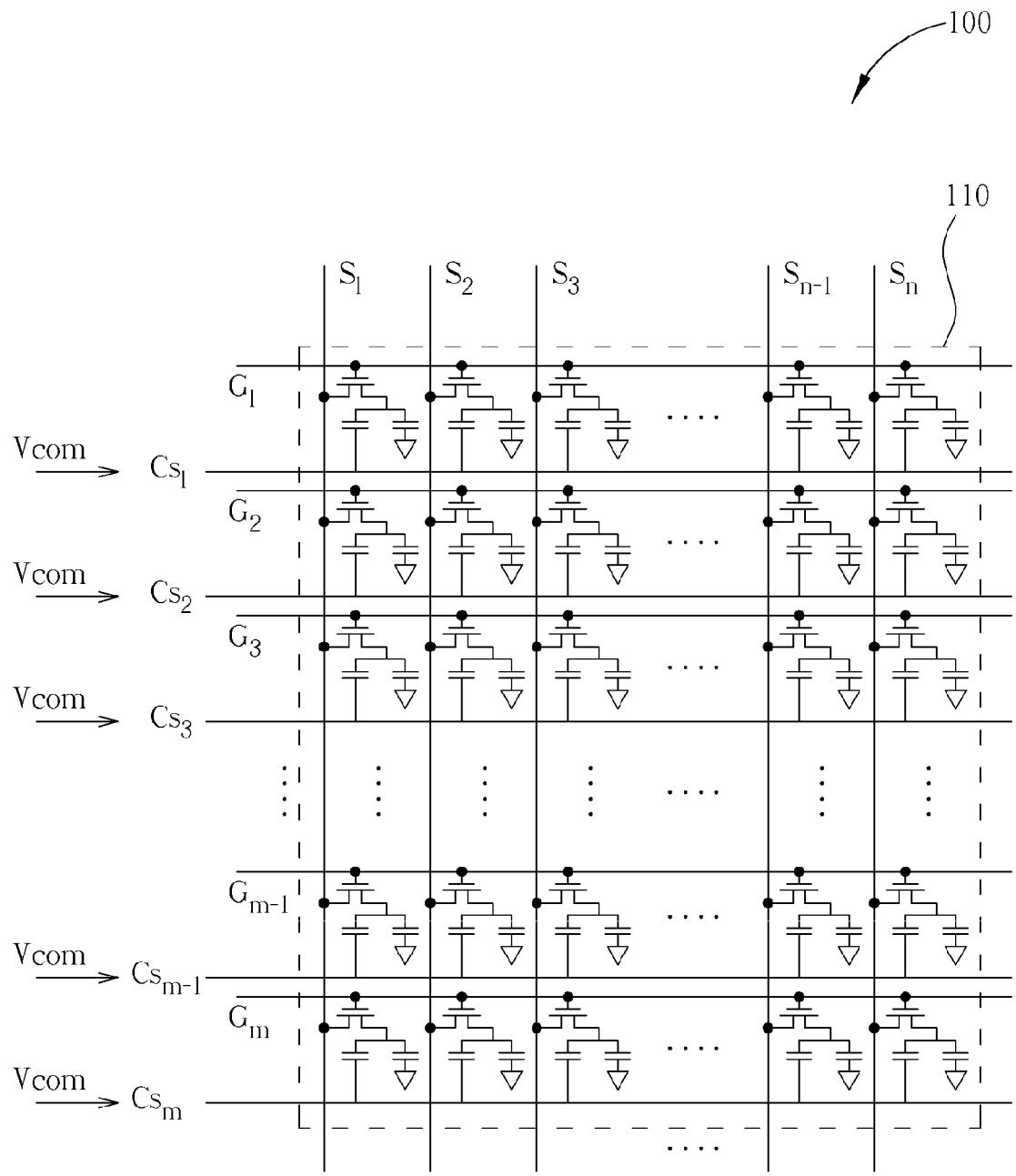
FIG. 1 is a diagram illustrating a prior art liquid crystal display panel.

In the operations of the LCD panel 200, a common electrode signal Vcom is inputted into the first common electrode lines $Csh_1$-$Csh_m$ and the second common electrode lines $Csv_1$-$Csv_n$ respectively through the input nodes $Ncom_1$-$Ncom_4$. In addition, because the first common electrode lines $Csh_1$-$Csh_m$ are electrically connected to the second common electrode lines $Csv_1$-$Csv_n$ in the pixel array 210, the common electrode line corresponding to each pixel in the pixel array 210 receives the common electrode signal from the left and top side of the pixel array 210. Compared with the prior art LCD panel 100 shown in FIG. 1, the LCD panel 200 of the present invention includes more input nodes, therefore, the common electrode signal carried on the common electrode lines in the pixel array 210 has less variation due to voltage variation on the scan lines or data lines, and the common electrode signal is more stable.

In practice, the above input nodes are common electrode signal output nodes of the driving circuits; that is, the input nodes $Ncom_1$ and $Ncom_2$ are common electrode signal output nodes of scan drivers, and the input nodes $Ncom_3$ and $Ncom_4$ are common electrode signal output nodes of data drivers. In addition, in this embodiment, the second common electrode lines $Csv_1$-$Csv_n$ are independent lines and provide little storage capacitance.

Figure 3:
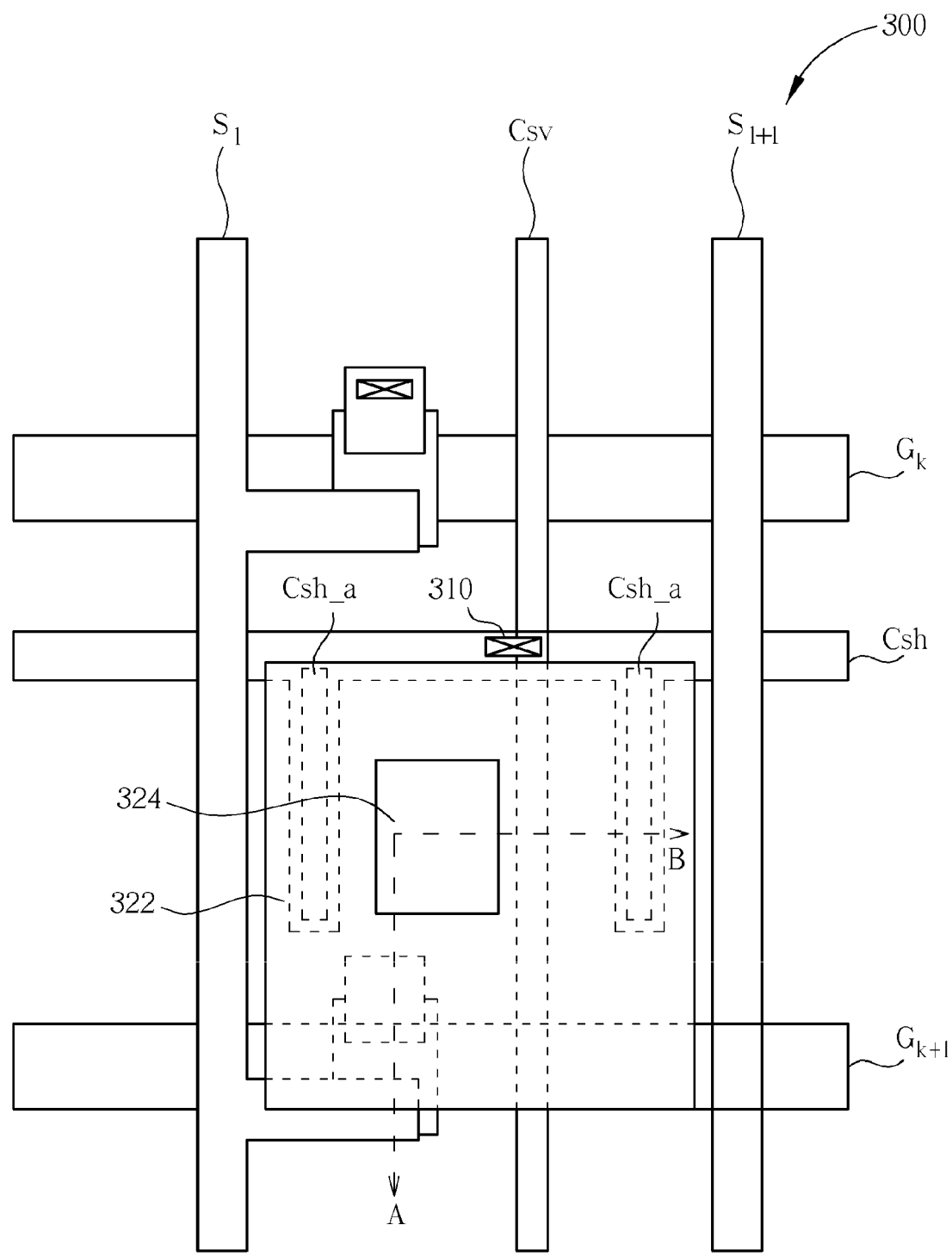
FIG. 3 is a diagram illustrating first common electrode lines electrically connected to second common electrode lines in a pixel array.
Figure 4:
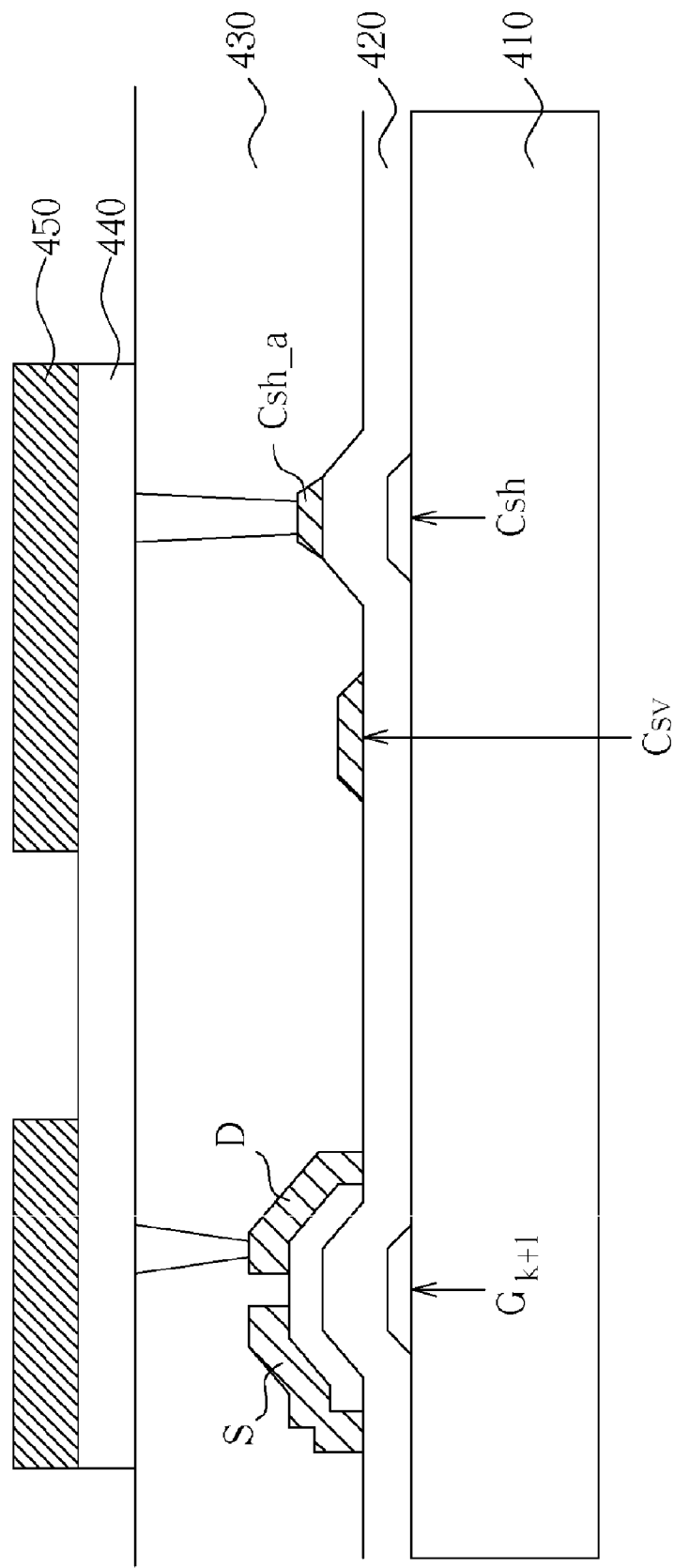
FIG. 4 is a cross-section diagram of the pixel shown in FIG. 3 along a line A-B.

Please refer to FIG. 3. FIG. 3 is a diagram illustrating the first common electrode lines electrically connected to the second common electrode lines in the pixel array. As shown in FIG. 3, in a pixel 300 of the pixel array 210, the first common electrode line Csh and the scan lines $G_k$ and $G_{k+1}$ make up a first metal layer formed by a first metal process, and second common electrode line Csv, auxiliary common electrode line Csh_a and the data lines $S_l$ and $S_{l+1}$ make up a second metal layer formed by a second metal process, where the first common electrode line Csh is electrically connected to the second common electrode line Csv by another conductive layer (not shown) through a through hole 310. In addition, the pixel 300 is a transflective design and includes a reflection region 322 and a transmission region 324. The second common electrode line Csv is formed under the reflection region 322 to avoid decreasing an aperture ratio of the pixel 300. Please refer to FIG. 4. FIG. 4 is a cross-section diagram of the pixel 300 shown in FIG. 3 along a line A-B. It is noted that the second common electrode line Csv has little storage capacitance. In FIG. 4, from a bottom layer to a top layer are, respectively, a glass base 410, an isolation layer 420, a flattened layer 430, a pixel electrode 440 and a reflection layer 450. In addition, a source electrode S and a drain electrode D of a thin-film transistor shown at the left side of FIG. 4 are respectively connected to the data line $S_l$ and the pixel electrode 440.

It is noted that the transflective type pixel 300 shown in FIG. 3 is merely an embodiment of the present invention. In practice, the second common electrode line Csv need not be limited to be the second metal layer, and the first common electrode line Csh can be electrically connected to the second common electrode line Csv by another connection method. In addition, the pixel 300 can also be a transmission-type pixel or a reflection-type pixel. For simplicity, as long as the second common electrode line Csv receives the common electrode signal through the input nodes $Ncom_3$ and $Ncom_4$, and the second common electrode line Csv is connected to the first common electrode line Csh in the pixel array 210, these alternative designs all fall within the scope of the present invention.

In addition, in the LCD panel 200, quantity of the second common electrode lines $Csv_1$-$Csv_n$ is equal to quantity of data lines $S_1$-$S_n$, and each second common electrode line is electrically connected to all the first common electrode lines $Csh_1$-$Csh_m$ in the pixel array 210. In practice, however, quantity of the second common electrode lines can be designed according to the designer's consideration, and each second common electrode line does not need to be electrically connected to all the first common electrode lines $Csh_1$-$Csh_m$. These alternative designs all fall within the scope of the present invention.

Figure 5:
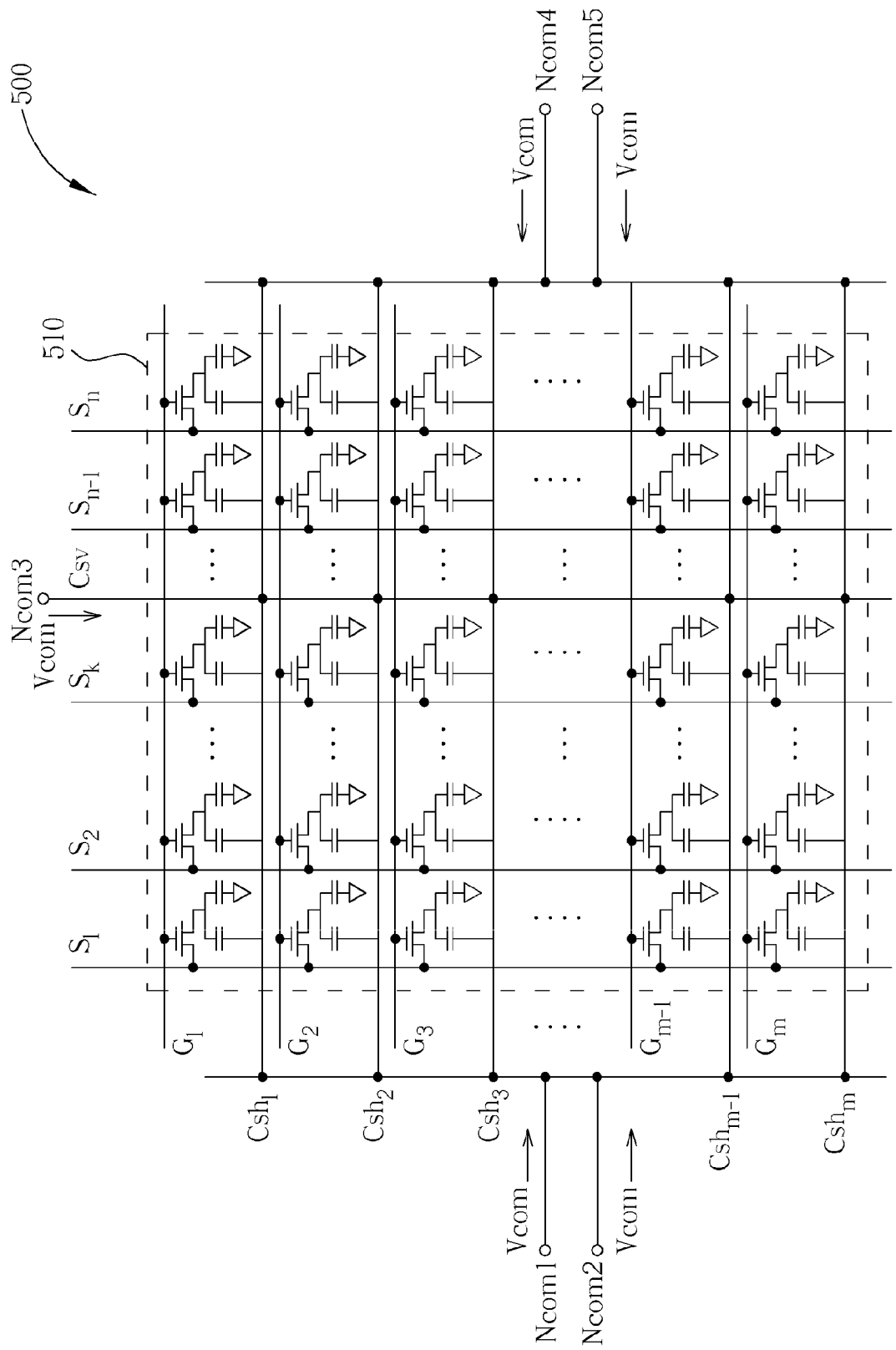
FIG. 5 is a diagram illustrating a liquid crystal display panel according to another embodiment of the present invention.

In addition, in the LCD panel 200, the first common electrode lines $Csh_1$-$Csh_m$ receive the common electrode signal Vcom through the input nodes $Ncom_1$ and $Ncom_2$ positioned at the left side of the pixel array 210; that is, the scan driver is positioned at the left side of the pixel array 210. However, for a larger size LCD panel, the scan lines and the common electrode lines receive signals from two sides of the pixel array to avoid signal delay; that is, the scan drivers are positioned at two sides of the pixel array. For this LCD panel, a following embodiment of the present invention can be utilized to stabilize the common electrode signal. Please refer to FIG. 5. FIG. 5 is a diagram illustrating a LCD panel 500 according to another embodiment of the present invention. A shown in FIG. 5, the LCD panel 500 includes a plurality of scan lines $G_1$-$G_m$, a plurality of data lines $S_1$-$S_n$, a pixel array 510, a plurality of first common electrode lines $Csh_1$-$Csh_m$, a second common electrode line Csv and a plurality of input nodes (in this embodiment, five input nodes $Ncom_1$-$Ncom_5$ are shown). The pixel array 510 includes a plurality of pixels, where the pixels are interwoven by the scan lines $G_1$-$G_m$ and data lines $S_1$-$S_n$. In this embodiment, the first common electrode lines $Csh_1$-$Csh_m$ are coupled to the input nodes $Ncom_1$, $Ncom_2$, $Ncom_4$ and $Ncom_5$ respectively positioned at a left side and a right side of the pixel array 510, and the second common electrode line Csv is coupled to the input node Ncom3 positioned at a top side of the pixel array 510. In addition, the second common electrode line Csv is electrically connected to the first common electrode lines $Csh_1$-$Csh_m$ in the pixel array 510. In addition, the operations of the LCD panel 500 are similar to the operations of the LCD panel 200 shown in FIG. 2, and the connections between the first common electrode lines and the second common electrode line of the LCD panel 500 are similar to that shown in FIG. 3. A person skilled in this art can easily understand the operations of the LCD panel 500 after reading the above embodiments of the present invention, and therefore further descriptions are omitted here.

It is noted that the LCD panel 500 includes only one second common electrode line Csv, and a position of the second common electrode line Csv is near a central line of the pixel array 510 (i.e., near respective centers of the first common electrode lines $Csh_1$-$Csh_m$). However, quantity of the second common electrode lines and positions of the second common electrode lines can be changed according to designer's considerations, and these alternative designs all fall within the scope of the present invention.

Figure 6:
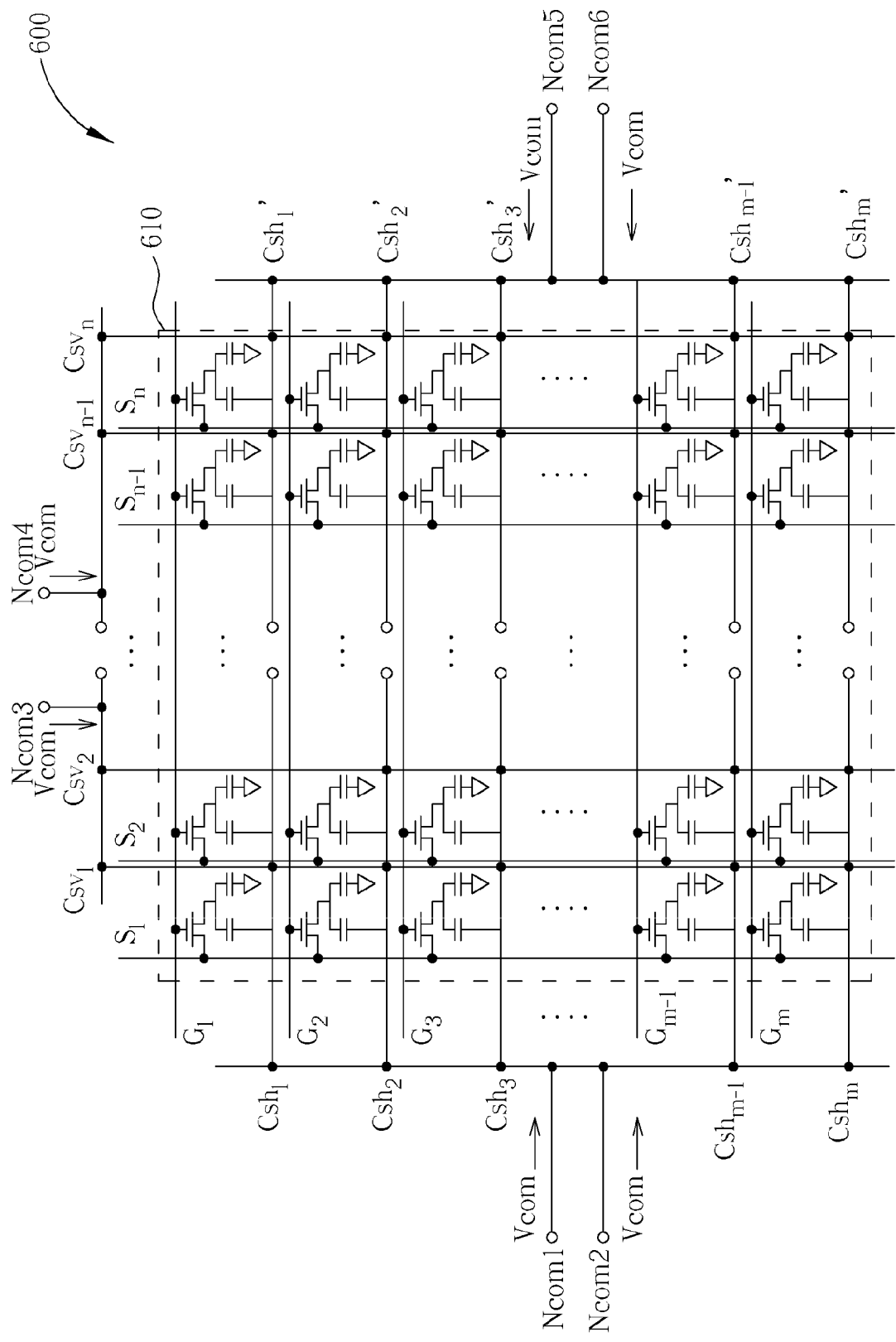
FIG. 6 is a diagram illustrating a liquid crystal display panel according to another embodiment of the present invention.

Please refer to FIG. 6. FIG. 6 is a diagram illustrating an LCD panel 600 according to another embodiment of the present invention. As shown in FIG. 6, the LCD panel 600 includes a plurality of scan lines $G_1$-$G_m$, a plurality of data lines $S_1$-$S_n$, a pixel array 610, a plurality of first common electrode lines $Csh_1$-$Csh_m$, a plurality of second common electrode lines $CSV_1$-$CSV_n$, a plurality of third common electrode lines $Csh_1'$-$Csh_m'$ and a plurality of input nodes (in this embodiment, six input nodes $Ncom_1$-$Ncom_6$ are shown). The pixel array 610 includes a plurality of pixels, where the pixels are interwoven by the scan lines $G_1$-$G_m$ and data lines $S_1$-$S_n$. In this embodiment, the first common electrode lines $Csh_1$-$Csh_m$ are coupled to the input nodes $Ncom_1$ and $Ncom_2$ both positioned at a left side of the pixel array 610; the second common electrode lines $Csv_1$-$Csv_n$ are coupled to the input nodes $Ncom_3$ and $Ncom_4$ both positioned at an upper side of the pixel array 610, where the input node $Ncom_3$ is electrically isolated from the input node $Ncom_4$; and the third common electrode lines $Csh_1'$-$Csh_m'$ are coupled to the input nodes $Ncom_5$ and $Ncom_6$ both positioned at a right side of the pixel array 610. In addition, the second common electrode lines $Csv_1$-$Csv_n$ are electrically connected to the first common electrode lines $Csh_1$-$Csh_m$ and the third common electrode lines $Csh_1'$-$Csh_m'$ in the pixel array 610, respectively, and the first common electrode lines $Csh_1$-$Csh_m$ are electrically isolated from the third common electrode lines $Csh_1'$-$Csh_m'$. In addition, the operations of the LCD panel 600 are similar to the operations of the LCD panels 200 and 500, and the connections between the first common electrode lines and the second common electrode line of the LCD panel 600 are similar to that shown in FIG. 3. A person skilled in this art can easily understand the operations of the LCD panel 600 after reading the above embodiments of the present invention, and therefore further descriptions are omitted here.

Briefly summarizing the present invention, the LCD panel includes first common electrode lines and the second common electrode lines, the first and second common electrode lines receive the common electrode signal from the scan driver and the data driver, respectively, and the first common electrode lines are electrically connected to the second common electrode lines in the pixel array. Therefore, stabilization of the common electrode signal in the pixel array is increased, degrees of crosstalk and flicker phenomena are decreased and display quality is improved.

Those skilled in the art will readily observe that numerous modifications and alterations of the device and method may be made while retaining the teachings of the invention.

What is claimed is:

1. A liquid crystal display panel, comprising:
   a plurality of scan lines;
   a plurality of data lines;
   a pixel array, comprising a plurality of pixels, wherein the pixels are interwoven by the scan lines and the data lines;
   a plurality of first common electrode lines, wherein the first common electrode lines are coupled to at least one first input node positioned at a first side of the pixel array, the first common electrode lines are parallel to the scan lines, and the first common electrode lines receive a common electrode signal through the first input node; and
   a plurality of second common electrode lines, wherein the second common electrode lines are parallel to the data lines, and the second common electrode lines receive the common electrode signal through at least one second input node positioned at a second side of the pixel array;
   a plurality of third common electrode lines, wherein the third common electrode lines receive the common electrode signal through at least one third input node positioned at a third side of the pixel array, and the first side is opposite to the third side;
   wherein the first common electrode lines are electrically connected to one of the second common electrode lines in the pixel array, and at least one third common electrode line is electrically connected to another second common electrode line in the pixel array, and the first common electrode lines are electrically isolated from the third common electrode lines.

2. The liquid crystal display panel of claim 1, wherein the second common electrode lines and the data lines both make up a same metal layer formed by a same metal process.

3. The liquid crystal display panel of claim 1, wherein quantity of the second common electrode lines are equal to quantity of the data lines.

4. The liquid crystal display panel of claim 1, being a transflective liquid crystal display panel.

* * * * *